United States Patent
Sellini et al.

(10) Patent No.: US 12,355,117 B2
(45) Date of Patent: Jul. 8, 2025

(54) ELECTROCHEMICAL INSTALLATION OPERATING AT HIGH TEMPERATURE AND ASSOCIATED PROCESS

(71) Applicant: TECHNIP ENERGIES FRANCE, Nanterre (FR)

(72) Inventors: Marc Sellini, Nanterre (FR); Xavier Boyault, Nanterre (FR); Thibault De Sorbier, Nanterre (FR)

(73) Assignee: TECHNIP ENERGIES FRANCE, Nanterre (FR)

( * ) Notice: Subject to any disclaimer, the term of this patent is extended or adjusted under 35 U.S.C. 154(b) by 308 days.

(21) Appl. No.: 17/871,207

(22) Filed: Jul. 22, 2022

(65) Prior Publication Data

US 2023/0032073 A1    Feb. 2, 2023

(30) Foreign Application Priority Data

Jul. 22, 2021   (FR) ..................................... 2107954

(51) Int. Cl.
| | | |
|---|---|---|
| *H01M 8/04* | (2016.01) | |
| *H01M 8/04007* | (2016.01) | |
| *H01M 8/04014* | (2016.01) | |
| *H01M 8/12* | (2016.01) | |
| *H01M 8/2475* | (2016.01) | |
| *H01M 8/2484* | (2016.01) | |
| H01M 8/1086 | (2016.01) | |

(52) U.S. Cl.
CPC ... *H01M 8/04067* (2013.01); *H01M 8/04014* (2013.01); *H01M 8/12* (2013.01); *H01M 8/2475* (2013.01); *H01M 8/2484* (2016.02); H01M 8/109 (2013.01)

(58) Field of Classification Search
CPC .......................... H01M 8/109; H01M 8/04067
USPC ........................................................ 429/483
See application file for complete search history.

(56) References Cited

U.S. PATENT DOCUMENTS

| | | | |
|---|---|---|---|
| 2006/0210841 A1 | 9/2006 | Wallace et al. | |
| 2009/0246582 A1* | 10/2009 | Craft, Jr. ........... | H01M 8/04007 454/239 |
| 2012/0270128 A1 | 10/2012 | Lam | |
| 2016/0036070 A1* | 2/2016 | Peterson ........... | H01M 8/04723 429/429 |

OTHER PUBLICATIONS

Search Report issued during prosecution of corresponding French Patent Application No. FR2107954 on Apr. 19, 2022. (2 pages).

* cited by examiner

*Primary Examiner* — James M Erwin
(74) *Attorney, Agent, or Firm* — Troutman Pepper Locke LLP; Gabrielle L. Gelozin

(57) ABSTRACT

An electrochemical installation operating at high temperature includes a plurality of stacks for carrying out electrochemical reactions, a heating furnace comprising a chamber intended for receiving the stacks, and a heater. The installation includes at least one rack including a self-supporting structure including a plurality of superimposed stages of stacks and/or including a plurality of self-supporting structures defining a plurality of superimposed stages of stacks. Each self-supporting structure comprises a fluid distributor configured to supply each stack with at least one fluid and/or to collect at least one fluid from each stack. The chamber is configured to contain at least one rack, the stack stages of the one rack or each rack contained in the chamber being intended for being commonly heated by the heater.

16 Claims, 6 Drawing Sheets

ELECTROCHEMICAL INSTALLATION OPERATING AT HIGH TEMPERATURE AND ASSOCIATED PROCESS

CROSS-REFERENCE TO RELATED APPLICATIONS

This application claims priority to and the benefit of French Patent Application No. FR 21 07954, filed Jul. 22, 2021, the entire contents of which are herein incorporated by reference in their entirety.

BACKGROUND OF THE INVENTION

The present invention relates to an electrochemical installation, including a plurality of fuel cell stacks (hereafter called "stacks") for carrying out electrochemical reactions, in particular for the production of electricity, for the production of gaseous compounds or for co-electrolysis, and a heating furnace comprising a chamber intended for receiving the one rack or each stack, and a heating system.

Such installation is intended for being installed on land or at sea, for the production of electricity from fuels such as hydrogen, methane, propane, butane, fermentation gases, gasified biomass, biofuels and synthetic fuels, ammonia, methanol, carbon monoxide, natural gas or/and paint vapors.

In a variant or in addition, the installation is intended for the production of a gaseous compound, e.g. hydrogen, from electricity produced e.g. by renewable sources of electricity, in particular by wind turbines, tidal power generators or solar panels or more generally by an electricity grid.

In yet another variant, the installation is intended for the production of gaseous compounds by co-electrolysis, e.g. for the production of synthesis gas intended for the synthesis of chemical constituents by electrolysis, from water and carbon dioxide.

The installation comprises a plurality of stacks which are, e.g., solid oxide electrolysis cells (SOEC) or solid oxide fuel cells (SOFC). The invention is further appliconfigured to other high temperature fuel cell technologies (over 100° C.).

Such cells are intended primarily for stationary applications with an output power ranging from 1 kW to 20 MW. The gaseous emissions thereof can be used for powering a secondary gas turbine so as to increase electrical efficiency. The gaseous emissions can further feed a catalytic burner generating water vapor which can be either used directly or recovered. Water vapor e.g. is produced in order to increase the overall electrical efficiency of the system if the water vapor is used to produce additional electricity.

A SOFC element (or electrochemical cell) generally consists of four layers, three of which are ceramics. Same has a typical thickness of a few millimeters. Tens or hundreds of such elements are then superimposed in series to form a stack.

In such elements, oxygen ions are moved through a solid oxide membrane used as an electrolyte at high temperature, in order to react with the gaseous fuel, e.g. hydrogen, on the anode side.

Ceramics used in SOFC become electrically and ionically active only when same reach a very high temperature. Consequently, to form an active membrane, the stacks have to reach temperatures on the order of 600° C. to 1200° C.

Due to the high operating temperature of SOFCs or SOECs, it is not necessary to provide an expensive catalyst (e.g. platinum), unlike for proton-exchange membrane fuel cells. It means that SOFCs or SOECs do not undergo catalytic poisoning with carbon monoxide, hence making same highly versatile.

Thermal expansion requires slow and uniform heating at the beginning thereof. Usually, one hour or more of temperature rise is required.

In known installations, fuel cell stacks or electrolyzer cells are integrated into a heat-insulated chamber of a small furnace normally used for firing ceramics. Conventionally, the stacks are loaded individually into a heat-insulated chamber and are placed at the bottom of the chamber in a number smaller than four. Utilities are associated with each chamber and connected to each stack so as to supply the various fluids needed and to recover the fluids produced. Such utilities are called Balance of Plant (BOP) and are further used for treating the gas as well for raising the temperature thereof via thermal recovery before reacting within the stacks.

The large-scale deployment of SOFC or SOEC units therefore involves the accumulation of a very large number of heat-insulated chambers and the same large number of BOPs.

The accumulation of low-capacity chambers raises many problems, including significant constraints on the layout of chambers so that same can be accessed for material handling.

Thus, the chambers cannot be positioned side-by-side in a compact manner, which means that clearance zones and multi-level structures are needed, along with the multiplication of pipes and isolation valves.

Such complexity, in addition to preventing a compact arrangement, thus significantly increases the lengths of pipes and the number of sensors and valves. The overall head losses in the system are then increased and the energy efficiency of the solution decreases. In addition, such multiplication of pipes involves increased risks of leakage or explosion.

Moreover, the multiplication of small chambers requires the provision of multiple insulation components, and an increased number of heating resistances for the chambers.

Such fragmented arrangement further involves operating difficulties, since each chamber must be brought to the operating temperature independently, which involves a very long start-up and shut-down time for the installation.

SUMMARY OF THE INVENTION

One aim of the invention is thus to provide an electrochemical installation operating at high temperature, intended e.g. for the generation of electricity and/or gaseous compounds or for co-electrolysis, which is not bulky, whereas remaining reliable and easy to operate.

To this end, the subject matter of the invention relates to an installation of the aforementioned type, characterized in that the installation includes at least one rack, the rack or each rack including a self-supporting structure including a plurality of superimposed levels of stacks or/and the rack or each rack including a plurality of self-supporting structures defining a plurality of superimposed levels of stacks, each self-supporting structure comprising a fluid distributor configured to supply each stack with at least one fluid and/or to collect at least one fluid from each stack, the chamber being configured to contain at least one rack, the stack stages of the rack or of each rack contained in the chamber being intended for being jointly heated by the heating system.

The installation according to the invention may comprise one or a plurality of the following features, taken alone or in any technically possible combination:

- the chamber is permanently mounted on a ground or floor;
- the installation comprises a plurality of racks, the chamber being suitable for containing the plurality of racks, the stacks of the racks contained in the chamber being intended for being jointly heated by the heating system;
- the heating furnace comprises internally, an atmosphere stirring system suitable for stirring the atmosphere in the chamber around each rack;
- the heating furnace includes a neutral gas injector in the chamber, configured to generate, during operation of the heating furnace, an overpressure of gas in the chamber, the heating furnace advantageously including an analyzer of gas extracted outside of the chamber;
- the number of stacks in each stack level of a rack is greater than four;
- the installation comprises a common fluid distribution system located outside the furnace, the distribution system comprising at least one incoming duct for a first feed fluid intended for each stack and at least one duct for discharging a first product fluid from each stack, the incoming duct for the first feed fluid and the first duct for discharging the product fluid being intended for being simultaneously connected to a plurality of self-supporting rack structures contained in the furnace, the fluid distributor of each self-supporting rack structure arranged in the chamber including:
- a first common supply pipe for the first fluid, connected to each stack of the rack and intended for being connected in a removable manner to the incoming duct for the first feed fluid when the self-supporting rack structure is arranged in the chamber;
- a first common pipe for recovering the first product fluid, which is connected to each stack and intended for being connected in a removable manner to the discharge duct for the first product fluid when the self-supporting rack structure is arranged in the chamber;
- the distribution system comprises at least one incoming duct for a second feed fluid intended for each stack and at least one duct for discharging a second product fluid in each stack, the incoming duct for the second feed fluid and the discharge duct for the second product fluid being intended for being simultaneously connected to the plurality of self-supporting rack structures contained in the furnace, the fluid distributor of each self-supporting rack structure arranged in the chamber including:
- a second common supply pipe for a second fluid, which is connected to each stack of the rack and intended for being connected in a removable manner to the incoming pipe for the second feed fluid when the self-supporting rack structure is arranged in the chamber;
- a second common pipe for recovering the second product fluid connected to each stack and intended for being connected in a removable manner to the discharge duct for the second product fluid when the self-supporting rack structure is arranged in the chamber;
- for each self-supporting rack structure, the distribution system includes:
- a first feed tapping tapped off from the incoming duct for the first feed fluid and intended for being connected in a removable manner to the first common supply pipe for the first fluid of the self-supporting rack structure;
- a second tapping tapped off from the discharge duct for the first product fluid and intended for being connected in a removable manner to the first common recovery pipe for the first product fluid of the self-supporting rack structure;
- the chamber extends longitudinally along a longitudinal axis, a plurality of self-supporting rack structures being arranged along the longitudinal axis, the incoming duct for the first feed fluid and the discharge duct for the first product fluid extending parallel to the longitudinal axis;
- each self-supporting rack structure is mounted so as to be movable with respect to the furnace between an operating position arranged in the chamber and a maintenance position, arranged outside the chamber;
- the chamber has a side door for a rack or a group of racks, each self-supporting structure of rack or group of racks being suitable for being extracted through the side door using a forklift or wherein the chamber has an upper door for a rack or group of racks, each self-supporting structure of rack or group of racks being suitable for being extracted through the upper door by a winch of an overhead crane;
- the electricity production stack is a fuel cell, in particular a solid oxide fuel cell, the fuel cell being configured to receive a first feed fluid consisting of a formed by a fuel and to produce a first product fluid comprising water, the fuel cell being configured to receive a second feed fluid comprising air, and being configured to produce a second product fluid;

or wherein the production stack is a stack for generating at least one gaseous compound, in particular an electrolysis or co-electrolysis cell, the electrolysis cell being advantageously configured to receive a first feed fluid comprising water or water and carbon dioxide, and to produce a first product fluid comprising hydrogen or hydrogen and carbon monoxide, the electrolysis cell being advantageously configured to receive a second feed fluid comprising air, and to produce a second product fluid comprising oxygen;

- the heating system includes at least one electrical resistance arranged in the chamber, the one or each electrical resistance being advantageously inserted in at least one metal tube provided with through holes and being preferentially placed at the rear of a muffle arranged in the chamber;
- each stack includes a plurality of unit stacking elements, arranged one on top of the other, each unit element including a first electrode, an electrolyte, in particular a solid electrolyte, and a second electrode of opposite polarity to the first electrode.

The invention further has as its subject matter an electrochemical process, including the following steps:

- providing an installation as defined above, the furnace chamber containing at least one rack including a self-supporting structure including a plurality of superimposed levels of stacks or/and each rack including a plurality of self-supporting structures defining a plurality of superimposed levels of stacks;
- activating a heating system in the chamber for jointly heating the stack stages of the one rack or each rack contained in the chamber;
- carrying out an electrochemical reaction in each stack of each rack contained in the chamber, in particular for the production of electricity, the production of gaseous compounds and/or for co-electrolysis.

The process according to the invention can comprise one or a plurality of the following features, taken alone or in any technically possible combination:

- the heating system brings the atmosphere in the chamber into contact with the one rack or each rack to a temperature above 400° C., preferentially comprised between 400° C. and 1300° C., advantageously between 600° C. and 1200° C.;

the process involves stirring the atmosphere around each rack with an atmosphere stirring system, the temperature of each stack of a rack or of each rack being different at most by 10%, from the average temperature of the stacks of the rack or of each rack during the joint heating of the stack stages;

during the joint heating of the stacking levels of the one rack or of each rack, the method includes a step of removing at least one self-supporting structure of rack from the chamber, at least one other self-supporting structure of rack remaining arranged in the chamber, and the process advantageously includes, after the removal step, a step of placing back the removed self-supporting structure of rack, or of installing another self-supporting structure of rack to replace the removed self-supporting structure of rack.

DESCRIPTION OF THE DRAWINGS

The invention will be better described upon reading the description which follows, given solely as an example, and made with reference to the enclosed drawings, wherein.

DETAILED DESCRIPTION

A first electrochemical installation 10 according to the invention, intended in particular for the generation of electricity and/or for the production of gaseous compounds and/or for co-electrolysis, is illustrated in FIGS. 1 to 5.

Figure 1:
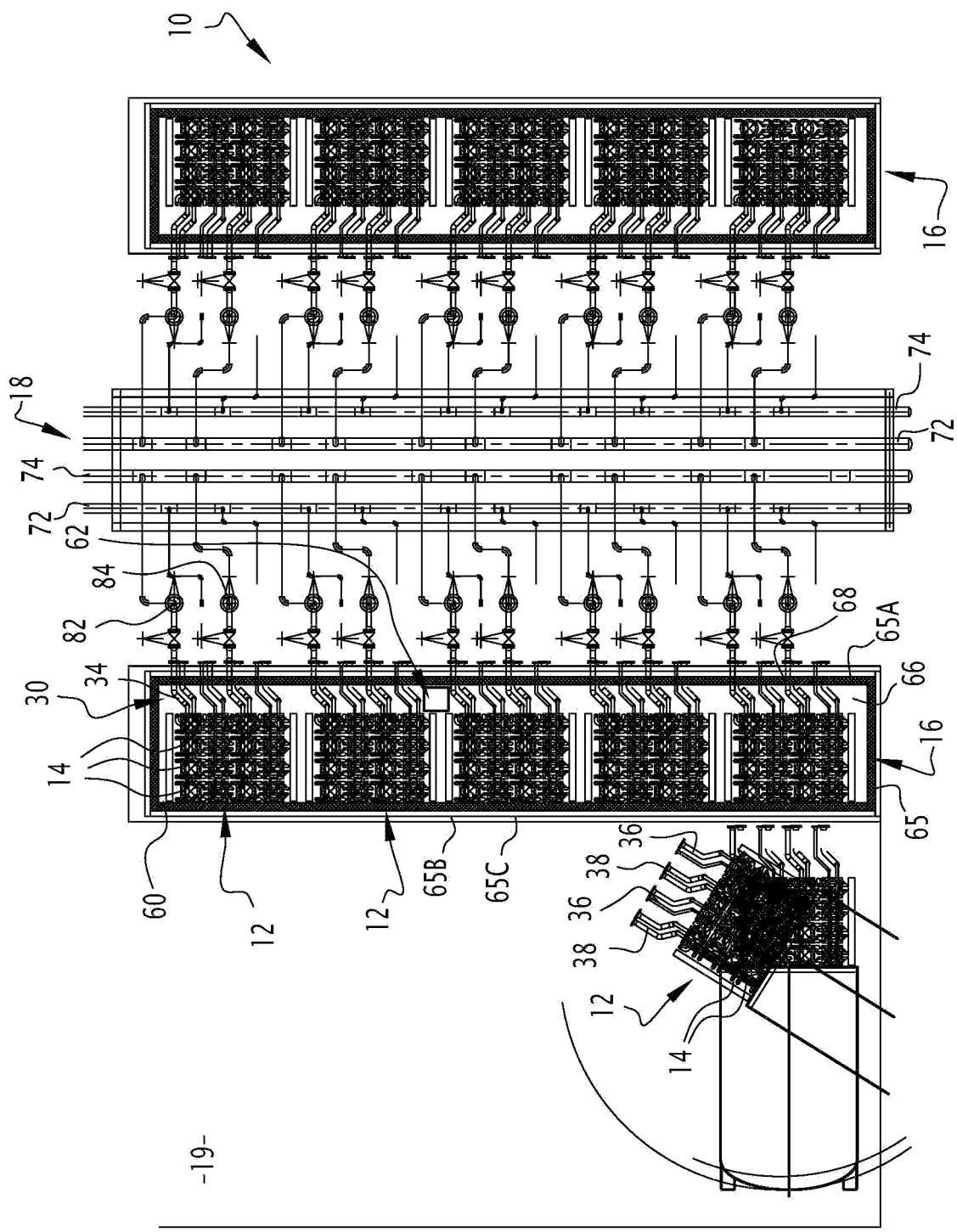
FIG. 1 is a top view of a first generation installation according to the invention.
Figure 2:
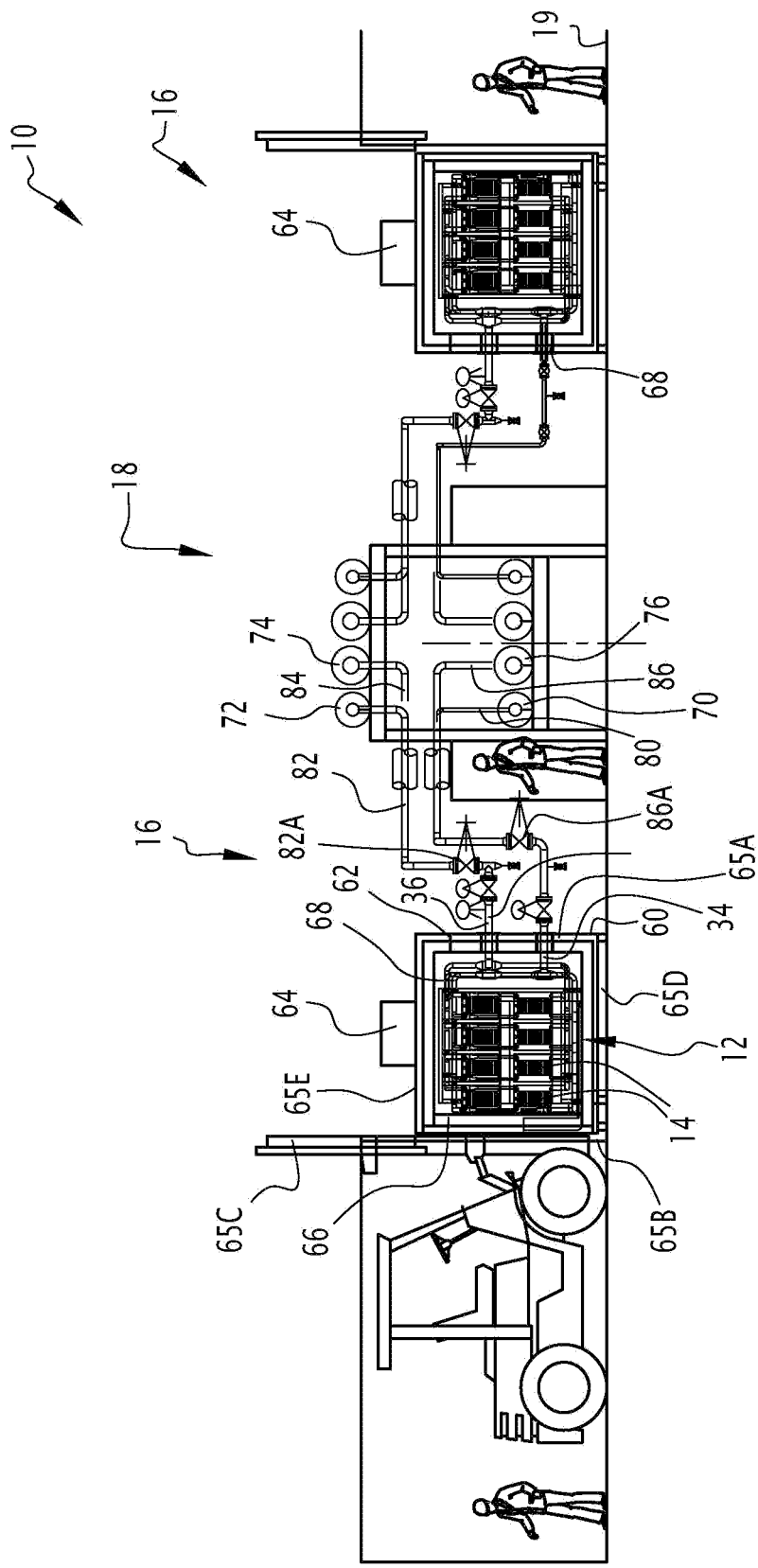
FIG. 2 is the view of partial section view taken along a vertical plane, of the installation shown in FIG. 1.

As shown in FIGS. 1 and 2, the installation 10 includes a plurality of individual racks 12, each rack 12 carrying a plurality of stacks 14 for carrying out implementation of electrochemical reactions, in particular for the production of electricity, for the production of gaseous compounds or for co-electrolysis.

According to the invention, the generation installation 10 includes at least one furnace 16 intended for containing at least one rack 12, and to jointly heat the stacks 14 of the rack or of each rack 12 contained in the furnace 16.

The generation installation 10 includes a fluid distribution system 18 intended for being fluidically connected to each rack 12 received in a furnace 16.

The installation 10 is intended for being installed on land or at sea, e.g. on a platform at sea. It rests on a ground or on a floor 19.

Each stack 14 generally includes a plurality of unitary stacking elements arranged one on top of the other. Each unitary element (or cell) includes a first electrode, an electrolyte, such as a solid electrolyte, and a second electrode of opposite polarity to the first electrode.

The electrodes are formed e.g. of flat unitary elements, and the geometry of the stack 14 is then a sandwich-type geometry. In a variant, each electrode consists of a tubular element, and the geometry of the stack 14 is then of the tubular type.

Figure 3:
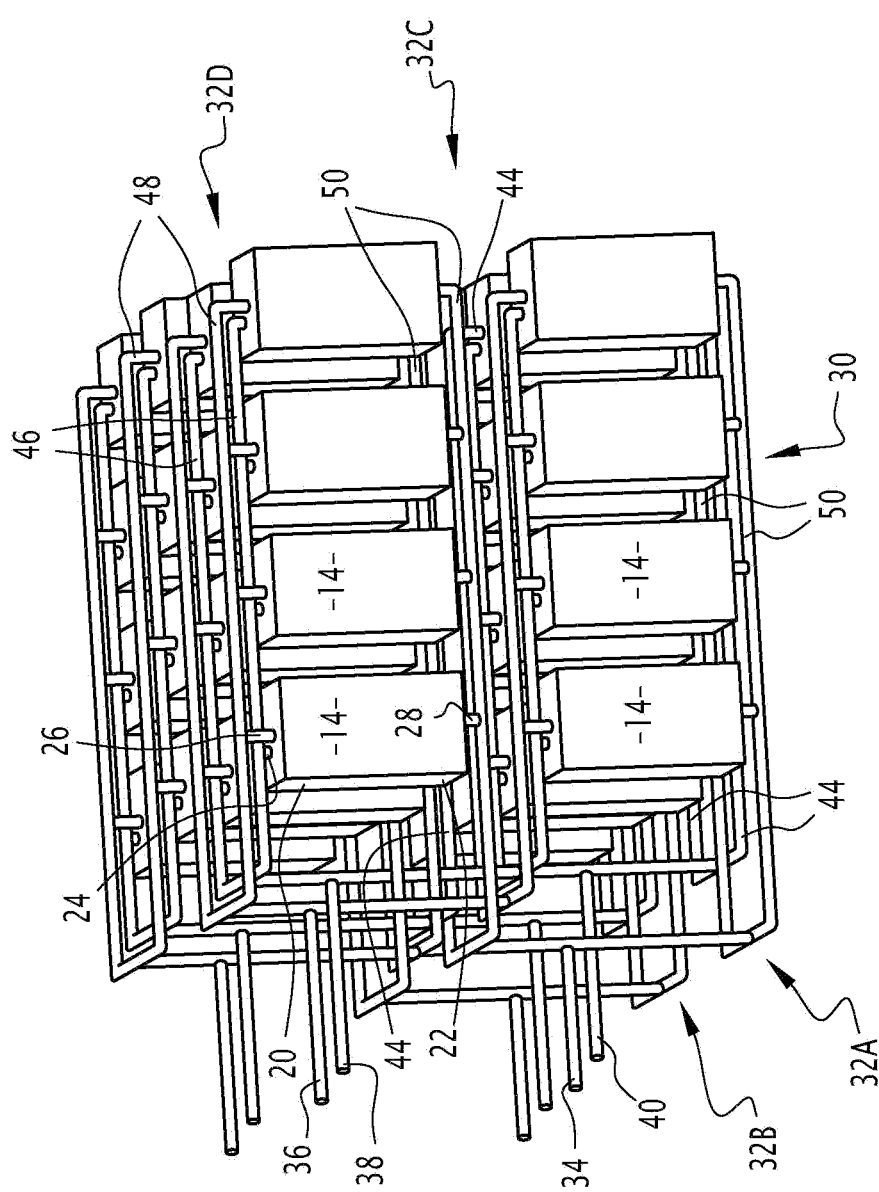
FIG. 3 is a partial perspective view of a rack comprising a plurality of stacks, the rack being intended for being introduced into a chamber of the installation shown in FIG. 2.

With reference to FIG. 3, each stack 14 includes a first inlet 22 for feeding a first feed fluid, and a first outlet 24 for recovering a first product fluid. The first inlet 22 and the first outlet 24 are in fluidic communication with each first electrode of each unitary element contained in the stack 14.

Similarly, the stack 14 includes a second inlet 26 for a second feed fluid and a second outlet 28 for recovering a second product fluid. The second inlet 26 and the second outlet 28 are in fluidic communication with each second electrode of each unitary element contained in the stack 14.

The stack 14 is e.g. a solid oxide fuel cell (or "SOFC", as defined above). In such case, the first electrode is an anode, and the first feed fluid is a fuel containing or consisting in particular of hydrogen, methane, propane, butane, fermentation gas, gasified biomass, biofuels and/or synthetic fuels, ammonia, methanol, carbon monoxide, natural gas and/or paint vapors. The first product fluid is then generally water, carbon dioxide and sometimes contains an excess of fuel which did not react within the stack 14.

The second electrode is a cathode. In the same case of a solid oxide fuel cell (or "SOFC", as defined above), the second feed fluid is air. The second product fluid is a residue of oxygen-depleted air.

The electrolyte acts as a membrane which separates the fuel on the anode side from the air on the cathode side. Same It is e.g. made of ceramic material, e.g. based on zirconium oxide.

An electron current is collected across the electrodes of each unit element for being supplied to an electrical grid.

As a variant, the stack is a solid oxide electrolysis cell ("SOEC", as defined above).

In such case, the first feed fluid to the anode is air and the first product fluid is oxygen. The second feed fluid at the cathode is water vapor, and the second product fluid is hydrogen.

As a further variant, the stack 14 is intended for the co-electrolysis of gaseous compounds, e.g. water vapor and carbon dioxide for forming e.g. a synthesis gas intended for the synthesis of chemical constituents.

The electrolysis reaction takes place under the effect of an electric current supplied to the electrodes terminals of each unit element, e.g. from an electricity grid, or/and from an electric power generation plant, in particular from a renewable electricity generation plant, e.g. including at least one wind turbine, at least one tidal power generator marine turbine or/and at least one solar panel.

The number of unit elements in each stack 14 is preferentially greater than ten and is in particular comprised between fifty and two hundred.

With reference to FIG. 3, the rack 12 is a self-supporting structure having a plurality of stages, movable individually and in one piece with respect to other racks 12. In a variant, the rack 12 is a stack of stages of self-supporting structures.

Each self-supporting structure is configured to be introduced into the furnace 16 and to be extracted from the furnace 16 in one piece.

In FIG. 3, a rack 12 comprising a self-supporting structure having two identical elementary stages is illustrated.

Each self-supporting structure of a rack 12 carries a plurality of stacks 14 which are jointly movconfigured together, independently of the stacks 14 present in other racks 12 contained in the furnace 16 or, where appropriate, independently of the stacks 14 present in another self-supporting structure of the same rack 12.

Each self-supporting structure of a rack 12 further includes a fluid distributor 30 specific to the self-supporting structure of rack 12, intended for supplying, from the distribution system 18 common to all the racks 12, each stack 14 of the rack 12 with a first feed fluid and a second feed fluid, and for recovering, from each stack 14 of the rack 12, the first product fluid and the second product fluid in order to bring same back to the distribution system 18 common to all the racks 12.

In the example shown in FIG. 3, each self-supporting structure of a rack 12 includes more than four stacks 14, in particular a number of stacks 14 greater than or equal to eight, in particular greater than or equal to sixteen, advantageously comprised between thirty-two and fifty-six.

The stacks 14 of each self-supporting structure of a rack 12 are e.g. organized on each stage in the form of rows 32A to 32D of the stacks 14.

In the example shown in FIG. 3, at least two rows 32A, 32B are parallel and are situated side by side on the same stage, and at least two rows 32C, 32D are situated above a row 32A, 32B, respectively, at another stage of the rack 12.

The stacks 14 situated on one stage of a rack 12 are distinct and are spaced vertically from the stacks 14 situated on another stage of the rack 12.

The distributor 30 of each self-supporting structure of a rack 12 includes a first common pipe 34 for supplying a first feed fluid, a first common pipe 36 for recovering a first product fluid, a second common pipe 38 for supplying a second feed fluid, and a second common pipe 40 for recovering a second product fluid, the common pipes 34 to 40 being intended for being connected to the distribution system 18.

The distributor 30 further comprises a branching connection 44 to 50 specific to each row 32A to 32D for fluidly connecting each common pipe 34 to 40 to each stack 14 arranged on a row 32A to 32D.

The common pipes 34 to 40 protrude parallel to one another beyond the stacks 14 and the connections 44 to 50. In this example, they extend horizontally.

Each common pipe 34 to 40 includes an end flange intended for being connected to the distribution system 18, in a removable manner.

Advantageously, the distribution flanges of at least four common pipes 34 to 40 of the same rack 12 are coplanar and are situated in a vertical plane perpendicular to the axis of each common pipe 34 to 40.

In the present example, the connections 44 to 50 are rigid pipes, all extending parallel to the corresponding common pipes 34 to 40.

Each connection 44 to 50 is connected to a corresponding common pipe 34 to 40 via one or more transverse branching connection.

Thus, each connection 44 is connected on the one hand to the first common pipe 34 and on the other hand to the first inlets 22 feeding the first feed fluid to each stack 14 of a row 32A to 32D, via a corresponding tapping.

The common pipe 34 is therefore the only pipe supplying feeding a first feed fluid to all the stacks 14 of the self-supporting structure of rack 12.

Each connection 46 is connected on the one hand, to the first common pipe 36 and on the other hand, to the first outlets 24 for recovering the first product fluid from each stack 14 of a row 32A to 32D, via a corresponding tapping.

The common pipe 36 is therefore the only pipe collecting the first product fluid through all the stacks 14 of the self-supporting structure of rack 12.

Each connection 48 is connected on the one hand, to the second common pipe 38 and on the other hand, to the second inlets 26 feeding the second feed fluid to each stack 14 of a row 32A to 32D, via a corresponding tapping.

The common pipe 38 is therefore the only pipe supplying a second feed fluid to all the stacks 14 of the self-supporting structure of rack 12.

Each connection 50 is connected to the second common pipe 40 and to the second outlets 28 for recovering the second product fluid from each stack 14 of a row 32A to 32D, via a corresponding tapping.

The common pipe 40 is therefore the only pipe collecting the second product fluid by all the stacks 14 of the self-supporting structure of rack 12.

As a variant, the connections 44 to 50 are flexible pipes which are connected on the one hand, to at least one rigid manifold connected to the common pipes 34 to 40 and on the other hand, to the inlets 22, 26 and to the outlets 24, 28, respectively, of each stack 14.

Figure 4:
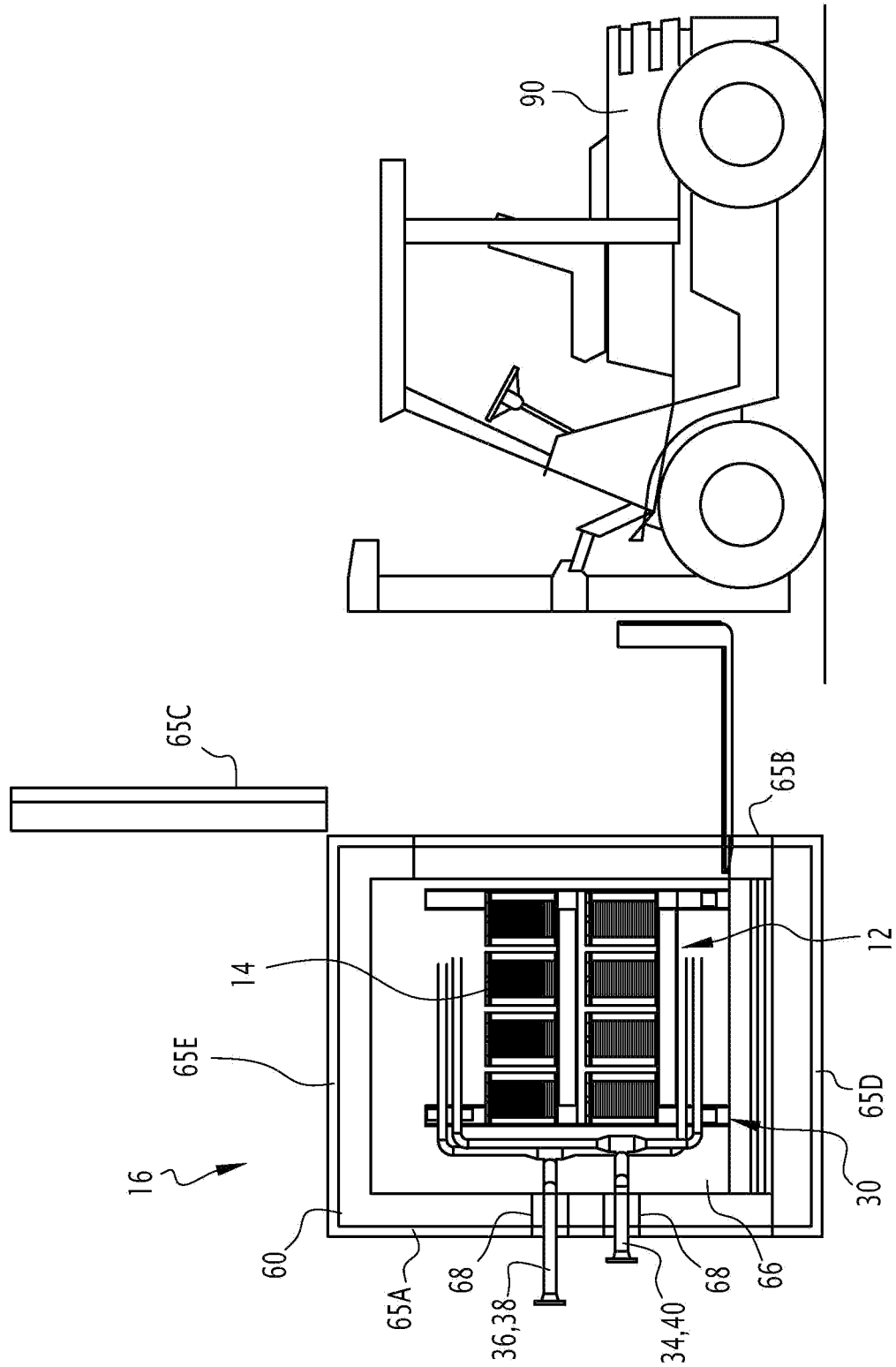
FIG. 4 is a view similar to FIG. 2, during the introduction of a rack into a chamber of the installation shown in FIG. 2.
Figure 5:
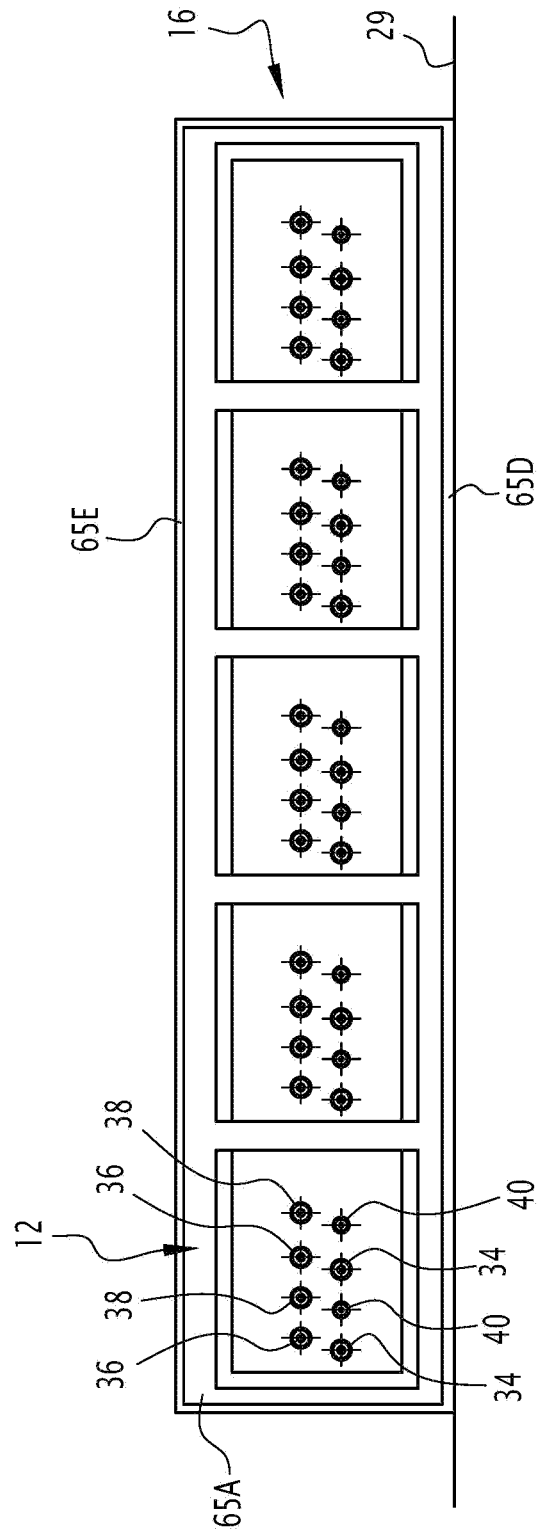
FIG. 5 is a view illustrating one side of the heating chamber, with the connections of each rack to common pipes.

As illustrated in FIGS. 1, 2 and 4, each self-supporting structure of a rack 12 is movable in one piece between a normal operating position, arranged in the furnace 16, and a maintenance position, arranged outside the furnace 16.

Each rack 12 has no self-heating means. The stacks 14 of each self-supporting structure of each rack 12 are intended for being jointly heated together with the stacks 14 of other racks 12 contained in the same furnace 16 or, where appropriate, with the stacks 14 of the other self-supporting structures of the same rack 12.

With reference to FIGS. 1 and 2, the furnace 16 includes a heat-insulated chamber 60, intended for receiving simultaneously at least one rack 12 for the joint heating of the stacks 14 present over a plurality of stages, a system 62 for heating the chamber 60, and an air stirring system 64 (visible in FIG. 2) for homogenizing the temperature in the furnace 16, in particular during the start-up phases and during the operating phases.

The chamber 60 is here formed by the walls 65A to 65E delimiting a parallelepipedal internal volume 66. The walls 65A to 65E are thermally insulated. They have e.g. a thermal conductivity of less than 0.5 W/m·K.

In the present example, the internal volume 66 of the chamber 60 is configured to receive at least one rack 12, in particular between a rack 12 and ten racks 12. The internal volume 66 of the chamber 60 is thus configured to contain more than ten stacks 14, in particular more than 100 stacks, e.g. a plurality of hundreds of stacks 14.

The internal volume of the chamber 60 is e.g. greater than 9 $m^3$ and is in particular comprised between 9 $m^3$ and 100 $m^3$.

When the chamber 60 receives the one rack or each rack 12, the free space not occupied by the racks 12 in the internal volume 66 is greater than 50% of the volume of a rack 12 in order to be configured to install in the chamber 60 the heating system 62, the muffles (e.g. made of refractory steel) and the internal air stirring system and the pipes 34 to 40.

The walls 65 include at least one side wall 65A placed opposite the distribution system 18, and at least one side wall 65B, here advantageously provided with side doors 65C opposite in front of each rack 12, giving access to the internal volume 66 so as to selectively insert each rack 12 into the internal volume 66 or to extract same outside the internal volume 66.

The walls 65 further include, if appropriate, a lower wall 65D and an upper wall 65E closing the internal volume 66 upwardly and downwardly, respectively.

The lateral wall 65A is provided with openings 68 for the crossing through of the common pipes 34 to 40, each opening 68 being configured to be crossed by a corresponding common pipe 34 to 40 of a rack 12.

Thus, when the self-supporting structure of a rack 12 occupies a normal operating position inserted in the internal volume 66, each common duct 34 to 40 of a self-supporting structure of a rack 12 protrudes from the internal volume 66 towards the distribution system 18 through a corresponding opening 68 in the lateral wall 65A for the connection to the distribution system 18.

Advantageously, when the self-supporting structure of a rack 12 occupies the maintenance position thereof outside the internal volume 66, the crossing openings 68 situated in front of the rack 12 in the normal operating position thereof are suitable for being blocked by a thermally insulating sleeve (not shown).

Thus, the other self-supporting rack structures 12 placed in the internal volume 66 remain in the normal operating position during the maintenance of one of the self-supporting rack structures 12 extracted from the internal volume 66.

The heating system 62 is configured to heat the gaseous atmosphere within the internal volume 66 in order to bring the atmosphere to a temperature above 450° C., e.g. Comprised between 450° C. and 1300° C., in particular between 600° C. and 1200° C.

In the present example, it includes electrical resistances. The resistances are e.g. installed vertically between the heat-insulated chamber 60 and the rack or each rack 12. The furnace 16 then advantageously includes an insulating plate called a "muffle".

This plate protects the connectors of the rack 12 from direct radiation. It is further possible to install a muffle/resistance/muffle system between the racks 12 when same are side by side.

Generally, the resistances provide rapid heating of the chamber 60 for the start-up and, if necessary, maintain the temperature in the event of an endothermic operation of the stacks 14 (likely to occur in electrolysis mode).

In such a case, the feed fluids introduced into the stack 14 are heated in order to maintain the stack 14 at a reaction temperature. In this way, the electrical power required to be supplied to the stack 14 is minimized in order to let the desired electrochemical reactions take place, particularly in electrolysis/co-electrolysis configurations.

Advantageously, each electrical resistance is inserted in at least one steel metal tube provided with through holes.

The electrical resistance is then protected from the outside during the start-up and shut-down phases. The steel tube has enough openings for the flow of the internal atmosphere and for heat exchanges.

The electrical resistances are suitable for heating the entire internal volume 66 so as to simultaneously raise the temperature of each rack 12 contained in the internal volume 66, and each stack 14 contained in a rack 12.

In a variant or in addition, the heating system includes at least one burner.

The stirring system 64 consist e.g. of stirrers, advantageously arranged in the upper wall 65E. The stirrers are configured to stir the gaseous atmosphere inside the internal volume 66 to improve the homogeneity of the heat exchanges. They are also suitable for being used to force rapid and controlled cooling of the temperature of the internal volume 66 within the furnace 16.

The stirrers significantly improve heat transfer and significantly reduce the heating and cooling time. They are suitable for generating a gas flow in the atmosphere around the or each rack 12.

Each stirrer comprises a rotary stirring member, carrying at least one blade and a motor for rotating the mobile member.

The stirrer is preferentially mounted in a wall of the chamber 60, the motor being located outside the internal volume 66 and the rotary stirring member being arranged in the internal volume 66.

Advantageously, the stirring system 64 is associated with a system (not shown) for injecting neutral gas (e.g. nitrogen) and, if appropriate, with an in-pipe analyzer configured to detect a possible presence of hydrogen in an outlet flow outside the furnace 16.

Stirring provides an overpressure in the internal volume 66 of the chamber 60.

In this way, the chamber 60 works in an inert atmosphere and the risks of accidents (explosion, ignition) are limited due to the expelling of possible leakage gases.

Air and therefore oxygen intakes are avoided, preventing the oxidation of the compounds of the chamber and of the contents thereof, along with the risks of explosions/ignition The overpressure also limits the risk of leakage from the stacks 14.

The tightness of the furnace 16 is further maximized in order to reduce the heat losses inherent in sweeping and/or stirring.

Since the stirring system 64 homogenizes the temperature within the entire internal volume 66, it authorizes the parallel operation in the same chamber 66 of a plurality of racks 12 or, where appropriate, of a plurality of stages of self-supporting structures of the same rack 12.

Stirring avoids the appearance of hot spots within the furnace 16 and therefore a significant increase in temperature (e.g. of more than 10% compared with the average temperature of the stacks 14) of certain stacks 14 compared with others.

Since the temperature of the various stacks 14 is constant and homogeneous, the risk of breakage of the stacks 14 and of significant disparities in the utilization rate of the stacks 14 is limited. The lifetimes of all the stacks 14 contained within the internal volume 66 are therefore homogeneous.

The layout of the stacks 14 in the form of the racks 12 within the internal volume 66 of the furnace 16, and the sharing of the supply of each rack 12 outside the furnace 16 by the distribution system 18 optimizes the space within the internal volume 66 so that same is occupied almost exclusively by the racks 12.

In this way, the thermal stresses applied to all the pipes are further minimized, since the distribution connections 44 to 50 in each stack 14 are situated directly in the internal volume 66 within the chamber 60 and are subject to the same temperature variations as the stacks 14.

In addition, heat exchanges can occur within the internal volume 66 between the various common pipes 34 to 40, and between the different connections 44 to 50. In this way, the implementation of the process becomes easier, and the heat exchanges dedicated to the implementation are eliminated, particularly the most cumbersome heat exchangers operating at the highest temperature of the system.

The presence of mobile self-supporting structures carrying a plurality of stacks 14 and of a furnace 16 common to a plurality of racks 12 or, where appropriate, to a plurality of self-supporting structures of a rack 12, avoids the need to supply a particular furnace per stack 14 or for a small group of individual stacks 14, since the utilities are shared via the distribution system 18, along with heating and ventilation. It is therefore no longer necessary to provide, for each stack 14, or for each small group of stacks 14, a specific heating system, a specific system of utilities, and a specific ventilation.

With reference to FIGS. 1 and 2, the distribution system 18 includes an incoming duct 70 for the first feed fluid, a duct 72 for discharging the first production fluid, an incoming duct 74 for the second feed fluid, and a duct 76 for discharging the second product fluid.

With reference to FIGS. 1 and 2, the distribution system 18 further includes, associated with each rack 12, the tappings 80 to 86 connected to each duct 70 to 76, respectively, each tapping 80 to 86 being provided with a corresponding connection valve (see 82A, 86A in FIG. 2) to connect each corresponding duct 70 to 76 to a respective common duct 34 to 40 of each rack 12.

In this example, at least one group of ducts 70 to 76 is associated with each furnace 16 for being connected to each rack 12 contained in the furnace 16. In the example shown in FIG. 1, two furnaces 16 are arranged in parallel with each other, each furnace 16 being provided with a distribution system 18 shared for the two furnaces.

In the example shown in FIG. 1, the ducts 70 to 76 extend parallel to a longitudinal axis A-A' of the furnace 16, along and in front of the side wall 65A.

The tappings 80 to 86 protrude transversely with respect to the axis A-A', toward the wall 65A, outside the latter.

At least part of the free ends of the tappings 80 to 86 lie in the same vertical plane parallel to the axis A-A'.

The free ends of the common pipes 34 to 40 are configured to be connected in a removable manner to the free ends of the tappings 80 to 86 when the rack or each rack 12 is situated in the internal volume 66 of the chamber 60, the common pipes 34 to 40 protruding standing out through the lateral openings 68.

Thus, the connections between the tappings 80 to 86 and each rack 12 are easily accessible so as to be configured to be verified and easily disconnected if a rack 12 or, where appropriate, a self-supporting structure of a rack 12 has to be moved outside the internal volume 66 of a furnace 16.

The arrangement of the ducts 70 to 76 parallel to the axis A-A' of the furnace 16 further increases the compactness of the installation 10, while maintaining easy access to the connections.

Thus, for the same surface area on the ground, the capacity of the installation 10 for electricity production and/or for fuel fluid is increased. On the contrary, for the same capacity of producing electricity and/or fuel fluid, the overall size of the installation 10 is reduced.

The operation of the installation 10 will now be described.

Initially, before the start-up, each rack 12 or each self-supporting structure of a rack 12 is set in place in the internal volume 66 of the furnace 16, e.g. by using a lift truck 90, as shown in FIG. 4.

When each rack 12 or each self-supporting structure of rack 12 is placed at a location in the internal volume 66, the side door 65C is opened, the rack or the self-supporting structure of rack 12 is advanced toward the lateral wall 65A by making the common pipes 34 to 40 cross through the respective openings 68.

The free ends of the common pipes 34 to 40 are then connected in a removable manner to the corresponding tappings 80 to 86 of the distribution system 18.

When all the racks 12 or when all the self-supporting structures of a rack 12 are installed in the chamber 60, the side doors 65C are closed and the internal volume 66 is closed.

The heating system 62 is activated by supplying power to the electrical resistances so as to bring the gaseous atmosphere inside the internal volume 66 to a temperature greater than 450° C., in particular comprised between 450° C. and 1300° C., e.g. between 600° C. and 1200° C. A progressive and common heating supported by the stirring of the internal atmosphere of the plurality of racks 12, or, where appropriate, of each self-supporting structure of a rack 12 and of each stack 14 contained in the one rack or each rack 12, is thus very easily obtained.

After that, the valves on the corresponding tappings 80 to 86 are open. The first feed fluid flows from the incoming duct 70 through each tapping 80 to the first common pipe 34 of each rack 12, and then through each connection 44 of the rack 12. The fluid then enters each stack 14 via the first inlet 22 connected to the connection 44. The first feed fluid reacts on the first electrode, generating a first product fluid.

The first product fluid is collected in each first outlet 24, then is collected in a connection 46, before reaching the first common pipe 36. The first product fluid is then discharged through the discharge duct 72 via the tapping 82.

Similarly, the second feed fluid flows from the incoming duct 74 through each tapping 84 to the second common pipe 38 of each rack 12, then through each connection 48 of the rack 12. The fluid then enters each stack 14 via the second input 26 connected to the connection 48.

The second feed fluid reacts on the second electrode, producing a second product fluid. The second product fluid is discharged through the second outlet 28, then through a connection 50 right to the second common pipe 40. The fluid is then collected in the evacuation duct 76 via the tapping 86.

When maintenance is to be performed on a particular stack 14 or on a particular rack 12, the door 65C situated opposite this rack 12 is open.

The valves 80A to 86A connected to the rack 12 are closed, and the free ends of the pipes 34 to 40 of the rack 12 are disconnected from the tappings 80 to 86.

The rack 12 or, where appropriate, the self-supporting structure of rack 12 is then removed from the internal volume 66, without having to move other racks 12 or, where appropriate, other self-supporting structures of rack 12 and is brought into the maintenance position thereof outside the internal volume 66. The rack 12 or, where appropriate, the self-supporting structure of rack 12 can be put back in place at the same place, once the maintenance has been performed, or alternatively, it can be replaced by another rack 12 or, where appropriate, by another self-supporting structure of rack 12.

Figure 6:
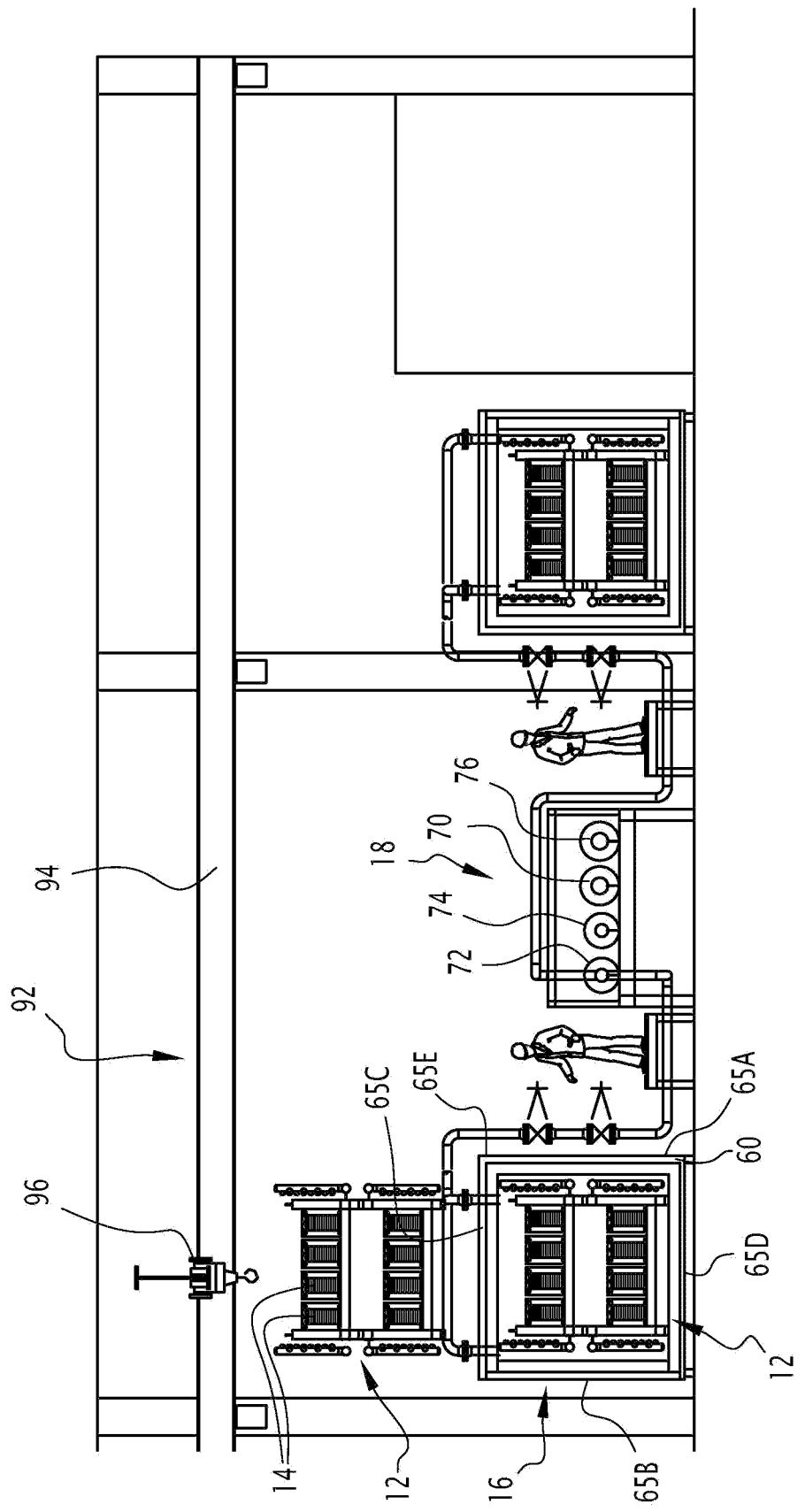
FIG. 6 illustrates a variant of installation according to the invention.

In the variant illustrated by FIG. 6, the access doors 65C to the interior volume 66 are situated on the upper wall 65E. Each rack 12, or where appropriate, each self-supporting structure of rack 12, is then movable through the upper wall 65E by means of an overhead crane 92, after a possible dismantling of the connecting pipes spool ("spool") of the distribution system 18 situated above the chamber 60.

In the present example, the overhead crane 92 comprises a horizontal beam 94 situated above the furnace 16, and a winch 96 mounted so as to be movable along the beam 94, transversely with respect to the axis A-A' of the furnace 16.

In such configuration, the stirring system 64 is e.g. installed under the rack or each rack 12. The chamber 60 is raised in order to locate the motors of the stirrers under the chamber 60.

Thus, no disassembly operation of the motor and stirrer assemblies is required during maintenance operations.

The operation of such variant installation 10 is moreover similar to that of the installation 10 shown in FIGS. 1 to 5.

In a variant (not shown), the ducts 70 to 76 of the distribution system 18 are located under the furnace 16, the openings 68 being then provided in a floor 65D of the chamber 60.

The invention claimed is:

1. An electrochemical installation, comprising:
a plurality of stacks configured to carry out electrochemical reactions;
a heating furnace comprising a chamber configured to receive each stack of the plurality of stacks, and a heater, wherein the heating furnace includes a neutral gas injector in the chamber, configured to generate, during operation of the heating furnace, a gas overpressure in the chamber;
at least one rack, the at least one rack including a rack self-supporting structure which includes a plurality of superimposed stack stages and/or the at least one rack including a plurality of rack self-supporting structures which define a plurality of superimposed stack stages,
each rack self-supporting structure comprising a fluid distributor configured to supply each stack with at least one fluid and/or to collect at least one fluid from each stack,
the chamber being configured to contain the at least one rack, whereby the superimposed stack stages of the at least one rack contained in the chamber being configured to be jointly heated by the heater.

2. The electrochemical installation according to claim 1, comprising a plurality of racks, the chamber being configured to contain the plurality of racks.

3. The electrochemical installation according to claim 1, wherein the heating furnace includes an atmosphere stirrer configured to stir an atmosphere in the chamber around the at least one rack.

4. The electrochemical installation according to claim 1, wherein a number of stacks in each superimposed stack stage of the at least one rack is greater than four.

5. The electrochemical installation according to claim 1, including a common fluid distributor situated outside the furnace, the common fluid distributor comprising at least one first incoming duct to deliver a first feed fluid to each stack and at least one first discharge duct to discharge a first product fluid produced in each stack, the first incoming duct and the first discharge duct being configured to be simultaneously connected to a plurality of rack self-supporting structures contained in the furnace, the fluid distributor of each rack self-supporting structure arranged in the chamber including:
a first common first fluid supply pipe, connected to each stack and configured to be connected in a removable manner to the first incoming pipe when the rack self-supporting structure is arranged in the chamber;
a first common first product fluid recovery pipe connected to each stack and configured to be connected in a removable manner to the first discharge duct when the rack self-supporting structure is arranged in the chamber.

6. The electrochemical installation according to claim 5, wherein the common fluid distributor comprises at least one second incoming duct to deliver a second feed fluid to each stack and at least one second discharge duct to discharge a second product fluid produced in each stack, the second incoming duct and the second discharge duct being configured to be simultaneously connected to the plurality of rack self-supporting structures contained in the furnace, the fluid distributor of each rack self-supporting structure arranged in the chamber including:
a second common second fluid feeding pipe, connected to each stack and configured to be connected in a removable manner to the second incoming duct when the rack self-supporting structure is arranged in the chamber;
a second common second product fluid recovery pipe, connected to each stack and configured to be connected in a removable manner to the second discharge duct when the rack self-supporting structure is arranged in the chamber.

7. The electrochemical installation according to claim 5, wherein the common fluid distributor includes, for each rack self-supporting structure:
a first supply tapping tapped off on the first incoming duct and configured to be connected in a removable manner to the first common supply pipe of the rack self-supporting structure;
a second discharge tapping tapped off on the first discharge duct and configured to be connected in a removable manner to the first common recovery pipe of the rack self-supporting structure.

8. The electrochemical installation according to claim 5, wherein the chamber extends longitudinally along a longitudinal axis, a plurality of rack self-supporting structures being arranged along the longitudinal axis, the first incoming duct and the first discharge extending parallel to the longitudinal axis.

9. The electrochemical installation according to claim 1, wherein each rack self-supporting structure is mounted movable with respect to the heating furnace between an operating position arranged in the chamber and a maintenance position arranged outside the chamber.

10. The electrochemical installation according to claim 9, wherein the chamber has, for a rack or a group of racks, a side door, each rack self-supporting structure of the rack or of the group of racks being configured to be extracted through the side door via a forklift or wherein the chamber includes, for a rack or group of racks, an upper door, each rack self-supporting structure of the rack or of the group of racks being configured to be extracted through the upper door by a winch of an overhead crane.

11. The electrochemical installation according to claim 1, wherein each stack is a fuel cell, the fuel cell being configured to receive a first feed fluid formed of a fuel, and to produce a first product fluid comprising water, the fuel cell being configured to receive a second feed fluid comprising air, and being configured to produce a second product fluid; or wherein each stack is an electrolysis or co-electrolysis cell, the electrolysis cell being configured to receive a first feed fluid comprising water or water and carbon dioxide, and to produce a first product fluid comprising hydrogen or hydrogen and carbon monoxide, the electrolysis cell being configured to receive a second feed fluid comprising air, and to produce a second product fluid comprising oxygen.

12. The electrochemical installation according to claim 1, wherein the heater includes at least one electrical resistance arranged in the chamber.

13. An electrochemical process, comprising:
providing the installation according to claim 1, the chamber containing at least one rack including a rack self-supporting structure which includes a plurality of superimposed stack stages and/or the at least one rack including a plurality of self-supporting structures which define a plurality of superimposed stack stages;

activating the heater in the chamber to jointly heat the superimposed stack stages of the at least one rack contained in the chamber;

carrying out an electrochemical reaction in each superimposed stack stage of the at least one rack contained in the chamber.

14. The electrochemical process according to claim 13, wherein the heater brings an atmosphere in the chamber which is in contact with the at least one rack to a temperature above 400° C.

15. The electrochemical process according to claim 13, including stirring an atmosphere around the at least one rack by an atmosphere stirrer, a temperature of each stack of the at least one rack being different by at most 10% from an average temperature of the stacks of the at least one rack during the common heating of the stack stages.

16. The electrochemical process according to claim 13, including, during the common heating of the stack stages, removing at least one rack self-supporting structure from the chamber, at least one other rack self-supporting structure remaining arranged in the chamber, and after the removal, placing back the removed rack self-supporting structure in the chamber, or installing another rack self-supporting structure, in place of the removed rack self-supporting structure.

* * * * *